United States Patent
Hasani

(10) Patent No.: US 9,917,776 B2
(45) Date of Patent: Mar. 13, 2018

(54) HASH-BASED ADDRESS MATCHING

(71) Applicant: Naader Hasani, San Jose, CA (US)

(72) Inventor: Naader Hasani, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 14/515,779

(22) Filed: Oct. 16, 2014

(65) Prior Publication Data

US 2016/0112319 A1 Apr. 21, 2016

(51) Int. Cl.
*H04L 12/743* (2013.01)
*H04L 12/745* (2013.01)

(52) U.S. Cl.
CPC ........ *H04L 45/7453* (2013.01); *H04L 45/748* (2013.01)

(58) Field of Classification Search
CPC .................................................. H04L 45/7453
See application file for complete search history.

(56) References Cited

U.S. PATENT DOCUMENTS

| | | | |
|---|---|---|---|
| 6,631,419 B1 * | 10/2003 | Greene | .................. H04L 45/54 370/392 |
| 7,483,430 B1 | 1/2009 | Yuan et al. | |
| 8,625,604 B2 | 1/2014 | Bando et al. | |
| 2006/0098652 A1 | 5/2006 | Singh et al. | |
| 2010/0040066 A1 | 2/2010 | Hao et al. | |
| 2011/0128959 A1 | 6/2011 | Bando et al. | |
| 2011/0145181 A1 * | 6/2011 | Pandya | ............. G06F 17/30985 706/27 |
| 2012/0136846 A1 | 5/2012 | Song et al. | |
| 2012/0158729 A1 * | 6/2012 | Mital | .................... G06F 15/167 707/738 |
| 2013/0246651 A1 * | 9/2013 | Keen | ..................... H04L 45/748 709/238 |

(Continued)

OTHER PUBLICATIONS

Bando and Chao, "FlashTrie: Hash-based Prefix-Compressed Trie for IP Route Lookup Beyond 100Gbps," INFOCOM, 2010 Proceedings IEEE, Mar. 2010, IEEE, San Diego, CA (nine pages).

(Continued)

*Primary Examiner* — Edan Orgad
*Assistant Examiner* — Nourali Mansoury
(74) *Attorney, Agent, or Firm* — The Law Office of Kirk D. Williams

(57) ABSTRACT

In one embodiment, a packet switching device comprises: a lookup chip including one or more processors and on-lookup chip memory, and off-lookup chip memory. In one embodiment, the lookup chip is configured to determine processing information for packets including performing a longest prefix match on a destination address of packets using progressive, exact matching of one or more single prefix length hash keys generated from the packets with entries in one or more hash tables until a matching hash table entry is found. The matching hash table entry is associated with particular information identifying how to process (e.g., manipulate, forward, drop) the corresponding packet. In one embodiment, entries of a hash table are distributed between said on-lookup chip memory and said off-lookup chip memory. In one embodiment, signatures of lookup keys are included in a hash table entry to quickly evaluate whether there is a match.

16 Claims, 11 Drawing Sheets

(56) References Cited

U.S. PATENT DOCUMENTS

2014/0029619 A1* 1/2014 Patton ................ H04L 45/7453
                                                    370/392
2015/0098470 A1* 4/2015 Sun ...................... H04L 45/748
                                                    370/392

OTHER PUBLICATIONS

Dharmapurikar et al., "Longest Prefix Matching using Bloom Filters," SIGCOMM '03, Aug. 2003, ACM Karlsruhe, Germany (twelve pages).
Waldvogel et al., "Scalable High-Speed Prefix Matching," ACM Transactions on Computer Systems, vol. 19, No. 4, Nov. 2001, New York, NY (forty-one pages).
PCT International Search Report and Written Opinion, PCT Application PCT/US2015/040078, ISA/EP European Patent Office, Netherlands, dated Sep. 25, 2015 (eleven pages).

* cited by examiner

HASH-BASED ADDRESS MATCHING

TECHNICAL FIELD

The present disclosure relates generally to processing (e.g., manipulating, dropping, forwarding) packets in a communications network, including performing packet address matching.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, which often uses longest prefix matching of an Internet Protocol (IP) packet's destination address in determining how to forward the IP packet.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
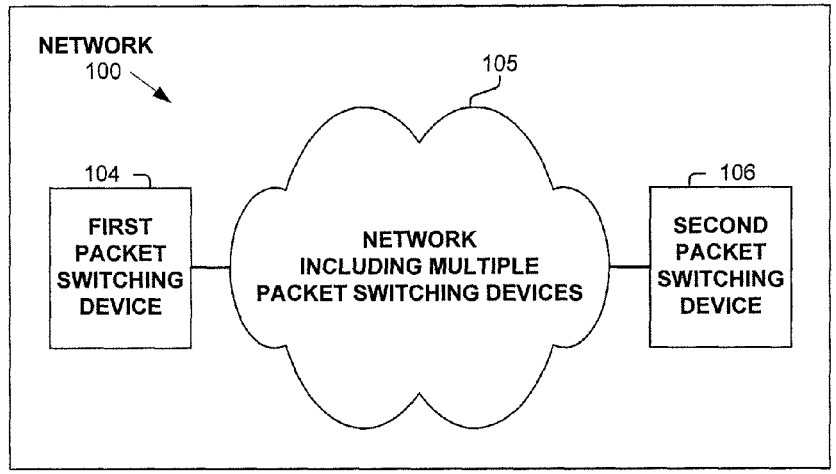
FIG. 1 illustrates a network operating according to one embodiment.

Disclosed are, inter alia, methods, apparatus, computer-storage media, mechanisms, and means associated with hash-based address matching.

One embodiment includes a method, comprising: determining, by a lookup chip of a packet switching device, processing information for a packet; and processing, by the packet switching device, the packet according to said processing information.

In one embodiment, said determining processing information includes: identifying a first hash bucket in a hash table, which includes deriving a hash key from the header of the packet and hashing the hash key using a first hash function, with the first hash bucket including a first entry stored across on-lookup chip memory and off-lookup chip memory, and with said processing information associated with the first entry; and confirming that the first entry matches the hash key which includes comparing information extracted from the hash key against one or more portions of the first entry stored in said on-lookup chip memory and one or more portions of the first entry stored in said off-lookup chip memory.

In one embodiment, said determining processing information includes: performing a longest prefix match on a destination address of the packet using progressive, exact matching of single prefix length hash keys generated from the packet with entries in one or more hash tables until a matching hash table entry is found, with the matching hash table entry associated with said processing information, wherein the matching hash table entry is found when one or more signatures of a particular hash key of said of single prefix length hash keys and all fields of the particular hash key match corresponding values in the matching hash table entry.

One embodiment, includes a packet switching device, comprising: off-lookup chip memory; and a lookup chip including one or more processors and on-lookup chip memory. In one embodiment, the lookup chip is configured to determine processing information for packets including performing a longest prefix match on a destination address of each particular packet of said packets using progressive, exact matching of one or more single prefix length hash keys generated from said particular packet with entries in one or more hash tables until a matching hash table entry is found, with the matching hash table entry associated with particular processing information for said particular packet, wherein an entry of said one or more hash tables is distributed between said on-lookup chip memory and said off-lookup chip memory.

2. Description

Disclosed are, inter alia, methods, apparatus, computer-storage media, mechanisms, and means associated with hash-based address matching. One embodiment determines processing information for a packet and then processes the packet accordingly. In one embodiment, this determination includes include a longest prefix matching operation (e.g., for determining how to processes Internet Protocol packets). In one embodiment, a single exact match operation is performed (e.g., for determining how to processes a layer-2 packet). In one embodiment, the same resources are shared for processing different types of packets, such as, but not limited to being employed by a unified L2/L3 forwarding engine. Different embodiments may use different memories, which have different characteristics. For example, one memory might provide a read result of 128 bits, while one memory might provide a read result of an entire 64, 96 or other numeric value bit, byte, megabyte or other size page of data. The hash table partitioning of entries and other design decisions are contemplated, such as, but not limited to adjust to a particular implementation and its intended use.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

FIG. 1 illustrates a network 100 operating according to one embodiment. Shown are two packet switching devices 104 and 106 and an interconnecting network 105, including a plurality of packet switching devices. In communicating a packet, including typically for an IP packet, a packet switching device 104, 105, 106 (e.g., router) often will perform a longest prefix match on the destination address of the packet (in an appropriate context such as in a virtual routing and forwarding "VRF" context) to determine how to process the packet. The packet is then processed accordingly. As used herein, "processing" of a packet typically includes forwarding of the packet, and can include dropping of a packet, manipulating the contents of the packet, etc.

Figure 2A:
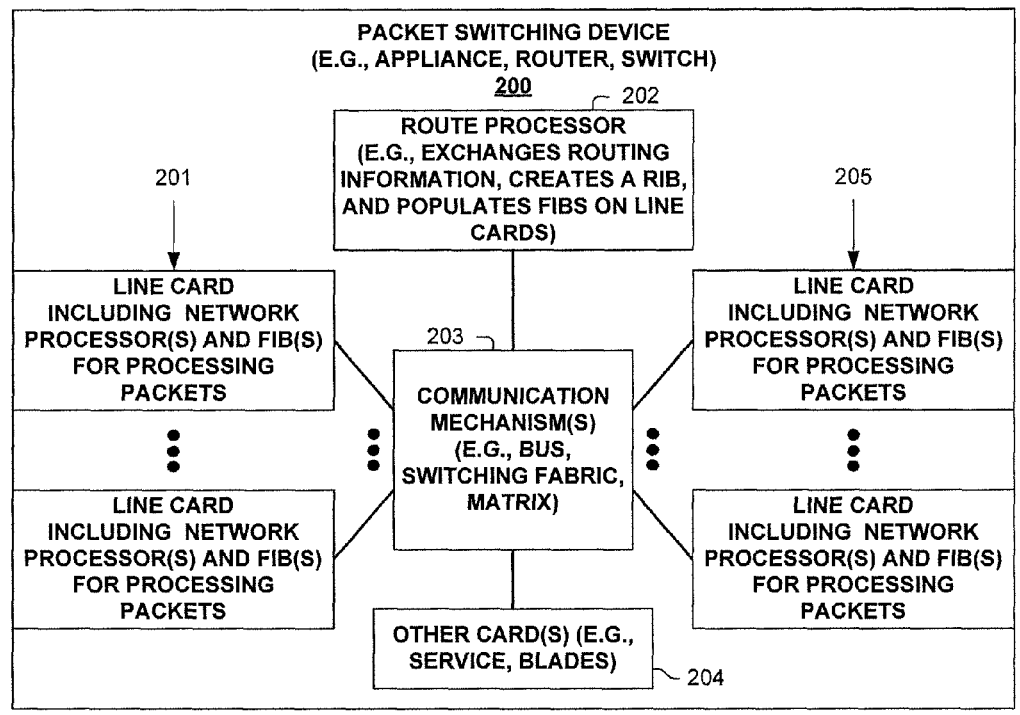
FIG. 2A illustrates a packet switching device according to one embodiment.

One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with hash-based address matching. Packet switching device 200 also has a control plane with one or more processing elements 202 for managing the control plane and/or control plane processing of packets associated with hash-based address matching. Packet switching device 200 also includes other cards 204 (e.g., service cards, blades) which include processing elements that are used in one embodiment to process packets associated with hash-based address matching, and some communication mechanism 203 (e.g., bus, switching fabric, matrix) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 perform hash-based address matching on forwarding information bases (FIBs) to determine how to ingress and/or egress process packets. Even though the term FIB includes the word "forwarding," this information base typically includes other information describing how to process corresponding packets.

Figure 2B:
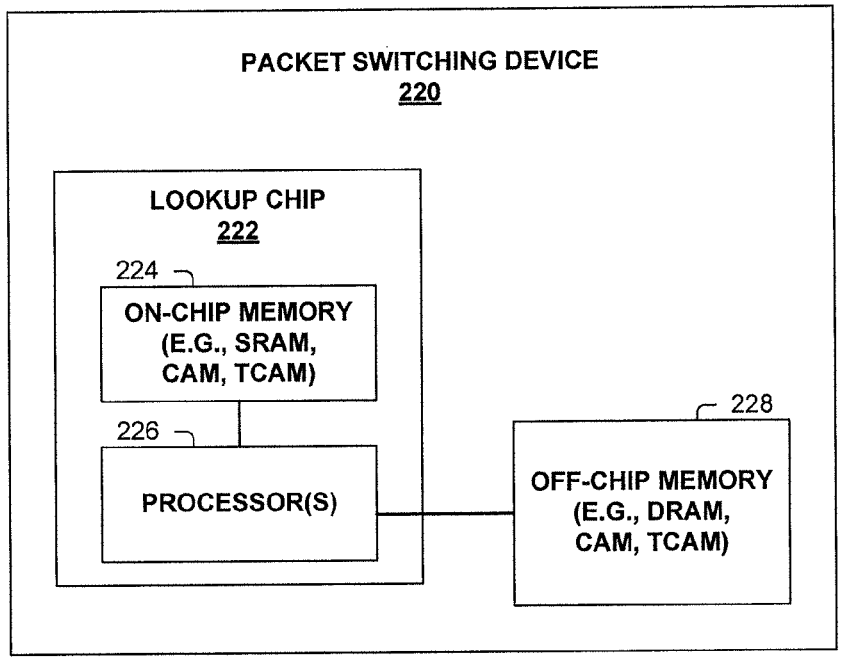
FIG. 2B illustrates a packet switching device according to one embodiment.

FIG. 2B illustrates a packet switching device 220 according to one embodiment. As shown, packet switching device 220 includes one or more lookup chips 222, which includes one or more processors 226 and on-chip memory 224 (e.g., SRAM, binary and/or ternary content-addressable memory). In addition, packet switching device 220 includes off-chip memory (e.g., DRAM, binary and/or ternary content-addressable memory). In one embodiment, processor(s) 226 perform hash-based address matching on hash tables stored in on-chip memory 224, stored in off-chip memory 228, and/or partially stored in each of on-chip memory 224 and off-chip memory 228.

Figure 2C:
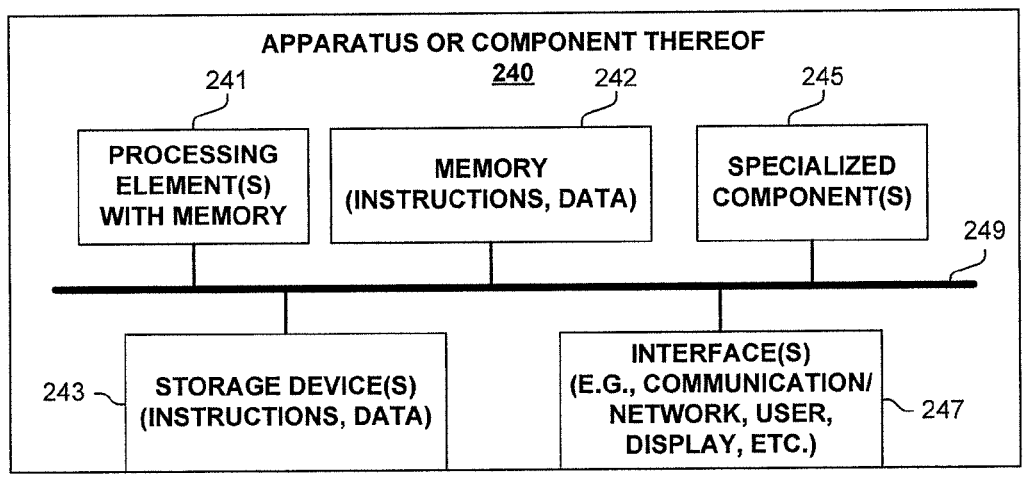
FIG. 2C illustrates an apparatus according to one embodiment.

FIG. 2C is a block diagram of an apparatus 240 used in one embodiment associated with hash-based address matching. In one embodiment, apparatus 240 performs one or more processes, or portions thereof, corresponding to one of the flow diagrams illustrated or otherwise described herein, and/or illustrated in another diagram or otherwise described herein.

In one embodiment, apparatus 240 includes one or more processing element(s) 241 (typically with on-chip memory), memory 242, storage device(s) 243, specialized component(s) 245 (e.g. optimized hardware such as for performing lookup and/or packet processing operations, etc.), and interface(s) 247 for communicating information (e.g., sending and receiving packets, user-interfaces, displaying information, etc.), which are typically communicatively coupled via one or more communications mechanisms 249, with the communications paths typically tailored to meet the needs of a particular application.

Various embodiments of apparatus 240 may include more or fewer elements. The operation of apparatus 240 is typically controlled by processing element(s) 241 using memory 242 and storage device(s) 243 to perform one or more tasks or processes. Memory 242 is one type of computer-readable/computer-storage medium, and typically comprises random access memory (RAM), read only memory (ROM), flash memory, integrated circuits, and/or other memory components. Memory 242 typically stores computer-executable instructions to be executed by processing element(s) 241 and/or data which is manipulated by processing element(s) 241 for implementing functionality in accordance with an embodiment. Storage device(s) 243 are another type of computer-readable medium, and typically comprise solid state storage media, disk drives, diskettes, networked services, tape drives, and other storage devices. Storage device(s) 243 typically store computer-executable instructions to be executed by processing element(s) 241 and/or data which is manipulated by processing element(s) 241 for implementing functionality in accordance with an embodiment.

Figure 3:
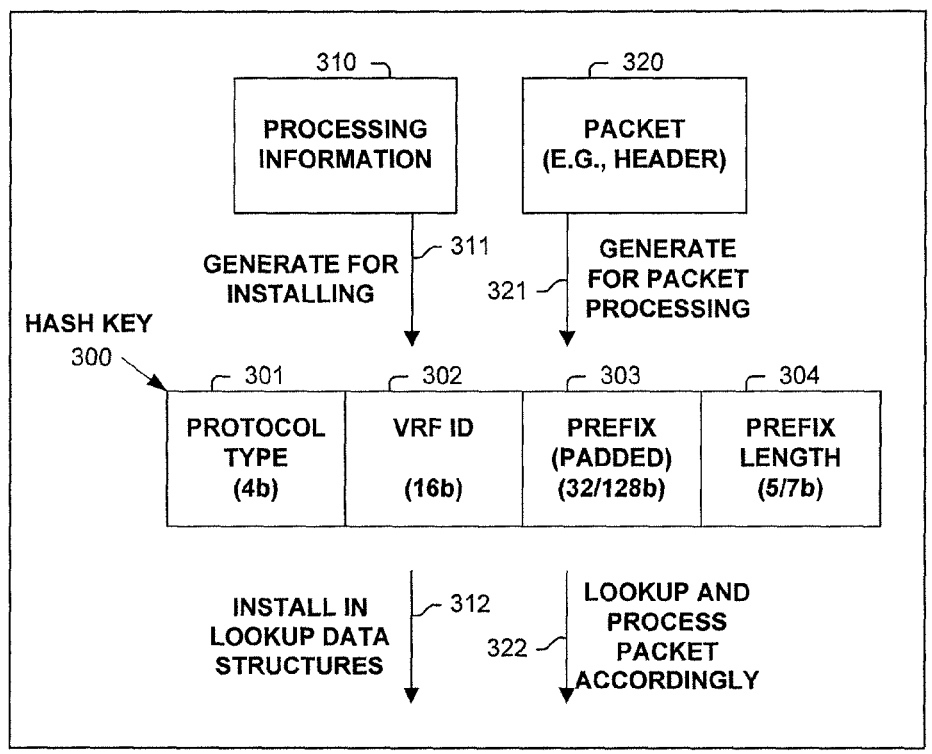
FIG. 3 illustrates processes according to one embodiment.

FIG. 3 illustrates control plane and data plane processing according to one embodiment. First, the hash table(s) must be installed with the prefixes to be searched. Processing information 310, including prefixes and corresponding rules, is available, such as, but not limited to that derived from routing information bases. Processing information 310 defines (311) the prefixes for which a corresponding hash key 300 should be installed (311) into a corresponding FIB (one or more hash tables) for performing data plane processing (321, 322) of packets. A hash key 300 is defined for a prefix to be installed in the FIB. A fully expanded address and prefixes with wildcard fields are examples of prefixes.

One embodiment uses hash key 300, while others use different formats of hash keys. As shown, hash key 300 includes a protocol type 301 (four bits), VRF identification 302 (sixteen bits), prefix 303 (which is padded if not a fully expanded address) (thirty-two bits for IP version four IPv4 and 128 bits for IP version six IPv6), and prefix length (304) (five bits for IPv4 and seven bits for IPv6).

In one embodiment, data plane processing of a packet 320 is performed as follows. A corresponding hash key 300 is generated (321) typically from the header of packet 320. A lookup operation (322) is performed on the hash key 300, with packet 320 being processed (322) accordingly.

Figure 4A:
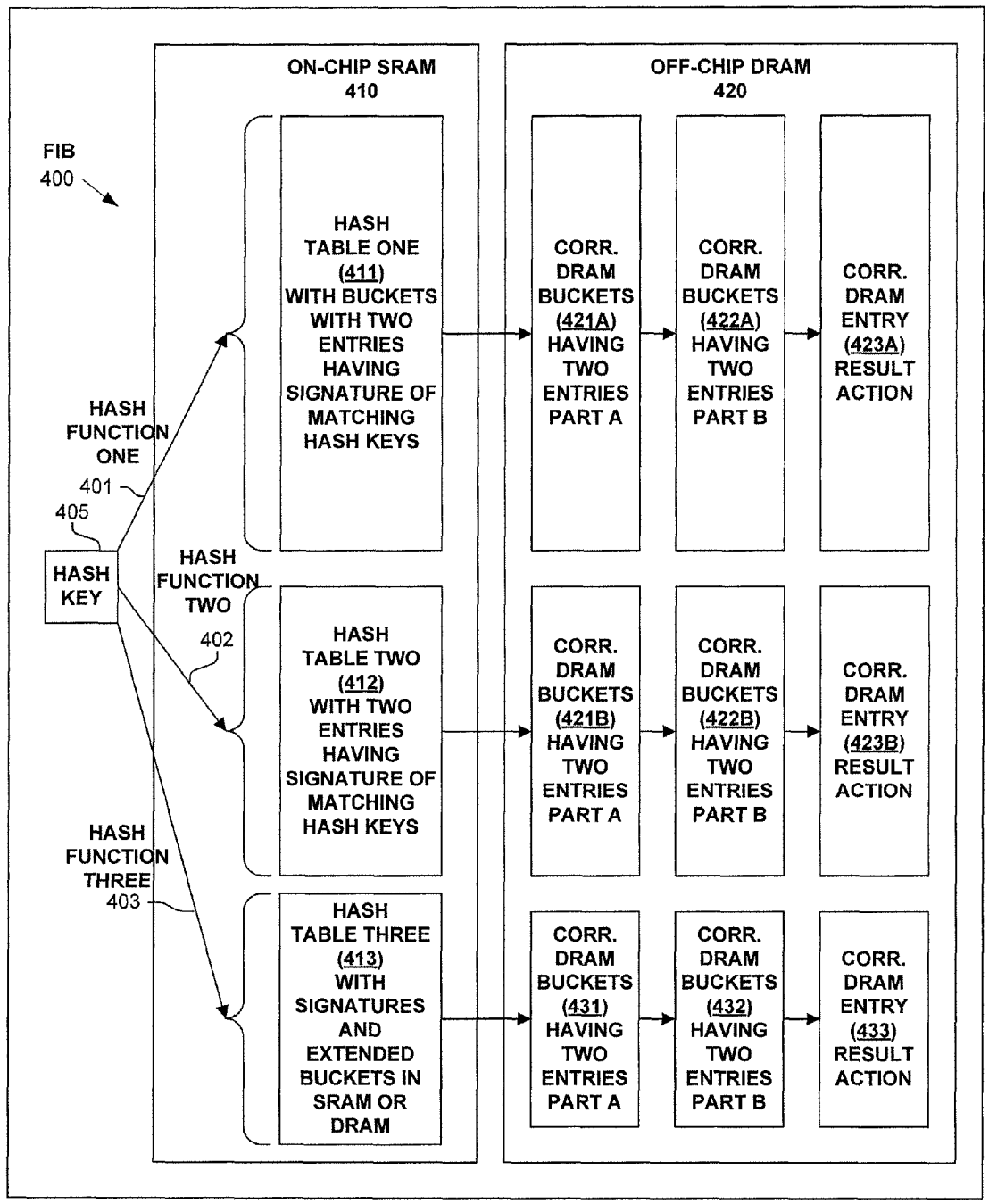
FIG. 4A illustrates processes according to one embodiment.

FIG. 4A illustrates processes according to one embodiment that uses a FIB 400 comprised of multiple hash tables 411, 412, 413, including one embodiment using three hash tables 411, 412, 413. One embodiment uses more or less hash tables than illustrated in FIG. 4A. One embodiment uses more or less entries per hash table bucket than illustrated in FIG. 4A. One embodiment uses multiple hash functions, such as, but not limited to a cyclic redundancy check (CRC) function.

In one embodiment, due to the size of a hash key and memory result pointers and/or other information cannot be stored in a single memory location, nor can the entire FIB 400 be stored in on-chip SRAM 410. One embodiment, such as that illustrated in FIG. 4A, uses three hash tables 411, 412, 413, each of which has entries which are partially stored in on-chip SRAM 410 and partially stored in off-chip DRAM 420. An entry for hash table one includes portion 411 in on-chip SRAM 410, portions 421A and 422A in off-chip DRAM 420, and corresponding resultant action 423A (e.g., how to process the packet) stored in off-chip DRAM 420. An entry for hash table two includes portion 412 in on-chip SRAM 410, portions 421B and 422B in off-chip DRAM 420, and corresponding resultant action 423B (e.g., how to process the packet) stored in off-chip DRAM 420. An entry for hash table three includes portion 413 in on-chip SRAM 410, portions 431 and 432 in off-chip DRAM 420, and corresponding resultant action 433 (e.g., how to process the packet) stored in off-chip DRAM 420.

For both installation in FIB 400 and data plane operation, a hash key 405 is hashed using a first hash function (401) into hash table one 411, a hash key 405 is hashed using a second hash function (402) into hash table two 412, and/or a hash key 405 is hashed using a third hash function (403) into hash table three 413. In one embodiment, each of hash table one 411 and hash table two 412 has two entries in each hash bucket. In one embodiment, hash table three 413 has two entries, but also can chain into an unlimited number of entries (e.g., using linked lists).

Figure 4B:
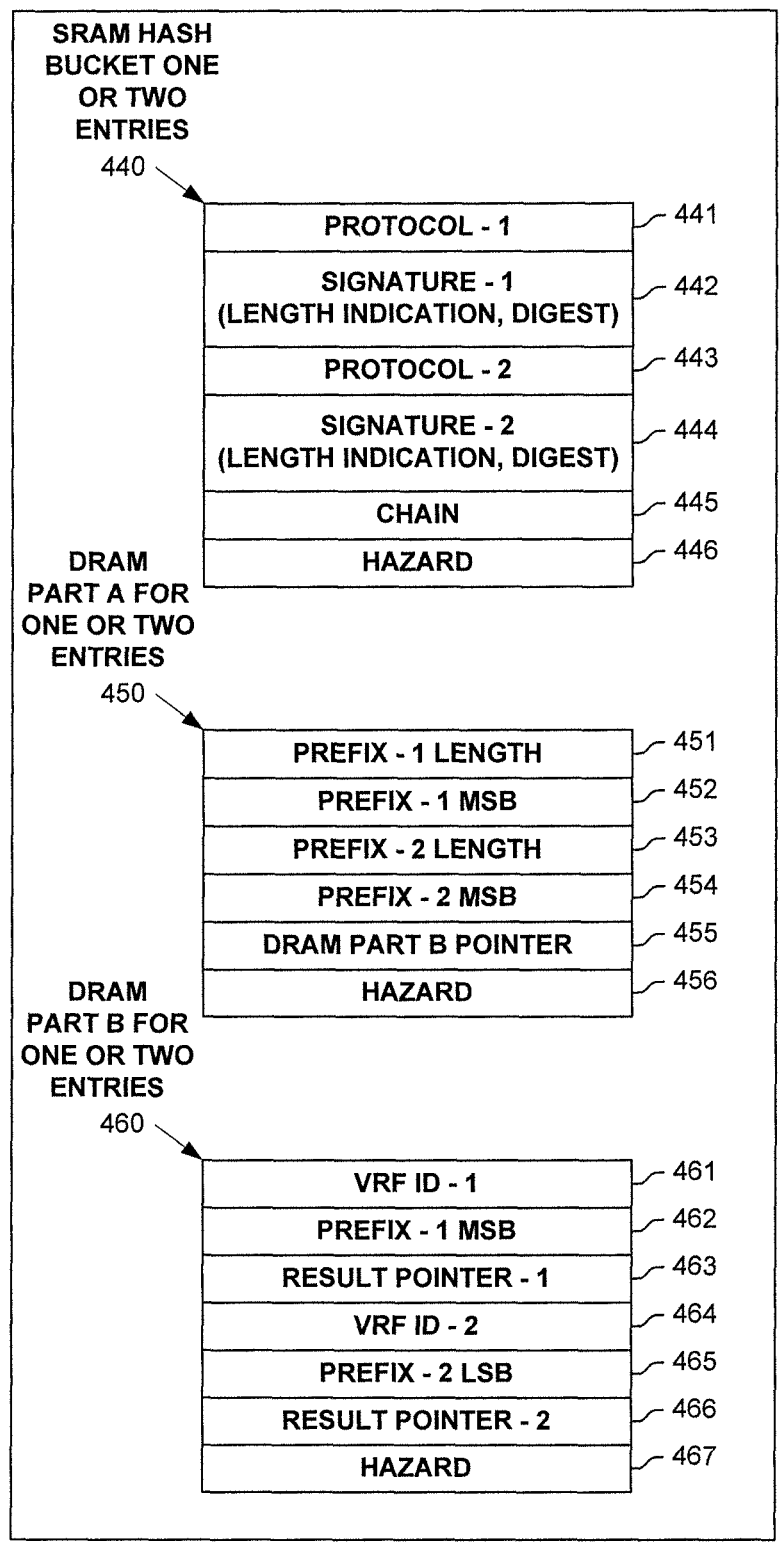
FIGS. 4B-C illustrate hash tables according to one embodiment.

FIG. 4B illustrates buckets used in hash tables one and two of one embodiment. In one embodiment, a hash table bucket with multiple entries is spread across three portions 440, 450, 460. In one embodiment, portion 440 is stored in on-chip SRAM, while portions 450 and 460 are stored in off-chip DRAM.

In one embodiment, hash bucket portion 440 includes information from two different hash bucket entries. This information for the first entry includes protocol 441 and signature 442, and for the second entry includes protocol 443 and signature 444. One embodiment includes chain field 445 to indicate that there may be an entry in another hash table that should be searched. In one embodiment, chain field 445 is a single flag. In one embodiment, chain field 445 includes information to identify which one or more hash tables may have a matching entry. One embodiment includes a hazard field 446 to indicate that the hash table is being updated in a manner which could affect the current lookup operation. In one embodiment, the location of a corresponding entry 450 in off-chip DRAM can be identified, so a memory pointer is not used. In one embodiment, entry 440 includes a memory pointer into off-chip DRAM for entry 440.

As used herein, a "signature" of a hash key refers to one or more characteristics of the hash key, but not the fields of the hash key itself. Because the entire hash key is not stored in the on-chip hash table entry, the signature provides characteristics of the stored hash key so that if the stored signature does not match the signature of the hash key which is the subject of the lookup operation, there is no need to retrieve a next portion of the hash bucket from off-chip DRAM. This can greatly reduce the hash table search time.

In one embodiment, a signature includes an indication of a range of prefix lengths of the prefix of the entry. In one embodiment, a single-bit flag is used to indicate whether the prefix length is between nineteen and twenty-four for IPv4, and between thirty-two and forty-eight for IPv6.

In one embodiment, a signature includes a "digest" which is a hashed value of one or more fields of the stored hash key. In one embodiment, the digest is four or five bits, thus reducing the searches to one-in-sixteen or one-in-thirty-two.

In one embodiment, hash bucket portion 450 includes information from two different hash bucket entries. This information for the first entry includes prefix length 451 and most-significant-bits 452 of the stored prefix, and for the second entry includes prefix length 453 and most-significant-bits 454 of the stored prefix. In one embodiment, the location of a corresponding entry 460 in off-chip DRAM can be identified, so a memory pointer is not used. In one embodiment, entry 450 includes a memory pointer 455 into off-chip DRAM for entry 460. One embodiment includes a hazard field 456 to indicate that the hash table is being updated in a manner which could affect the current lookup operation.

In one embodiment, hash bucket portion 460 includes information from two different hash bucket entries. This information for the first entry includes VRF ID 461, least-significant-bits 462 of the stored prefix, and result action memory pointer 463 (identifying where the stored resultant action on how to process the packet is stored); and the second entry includes VRF ID 464, least-significant-bits 465 of the stored prefix, and result action memory pointer 466. One embodiment includes a hazard field 467 to indicate that the hash table is being updated in a manner which could affect the current lookup operation.

Figure 4C:
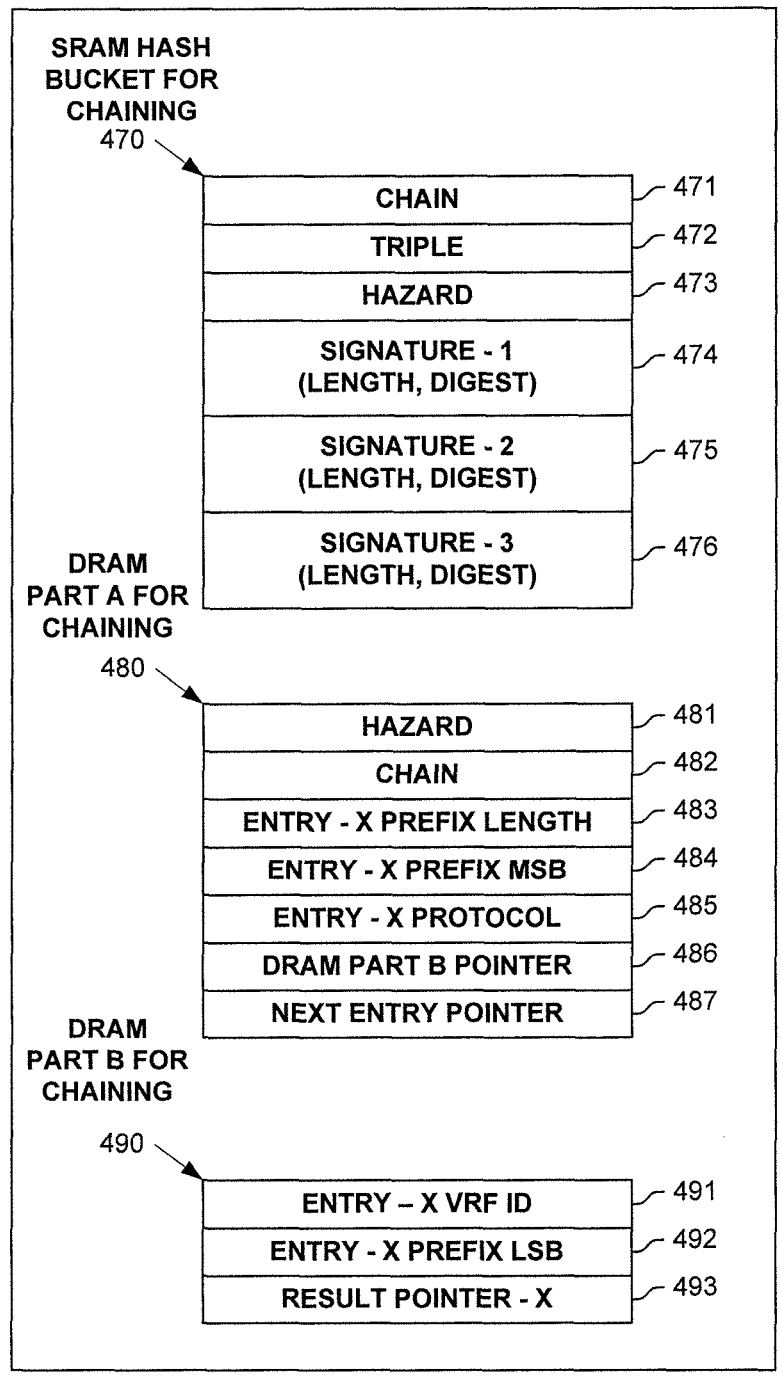

In one embodiment, hash table three includes a same hash bucket as described in relation to FIG. 4B when it contains only one or two entries. In one embodiment, hash table three provides for chaining of entries so that a bucket can have more than two entries, such as that illustrated in FIG. 4C.

In one embodiment when chaining entries, hash bucket portion 470 includes a chain flag 471 indicating more than two entries, and triple flag 472 indicating three or more entries when chain flag 471 is also set. One embodiment includes a hazard field 473 to indicate that the hash table is being updated in a manner which could affect the current lookup operation. In one embodiment, hash bucket 470 includes signature information 474, 475, 476, for three different bucket entries. In one embodiment, the location of a corresponding entry 480 in off-chip DRAM can be identified, so a memory pointer is not used. In one embodiment, entry 470 includes a memory pointer into off-chip DRAM for entry 480.

In one embodiment, hash bucket portion 480 includes information for a single hash bucket entry, with a linked-list pointer 487 to a next entry, when chain flag 482 is set. The use of "ENTRY—X" refers to which corresponding entry, with X being 1, 2, 3, etc. as needed. One embodiment includes a hazard field 481 to indicate that the hash table is being updated in a manner which could affect the current lookup operation. In one embodiment, hash bucket portion 480 includes for an entry: prefix length 483, most-significant-bits 484 of the stored prefix, protocol type 485, and memory pointer 486 to corresponding hash bucket portion 490.

In one embodiment, hash bucket portion 490 includes for a hash bucket entry: VRF ID 491, leash-significant-bits 492 of the stored prefix, and result action memory pointer 493 (identifying where the stored resultant action on how to process the packet is stored).

Figure 5:
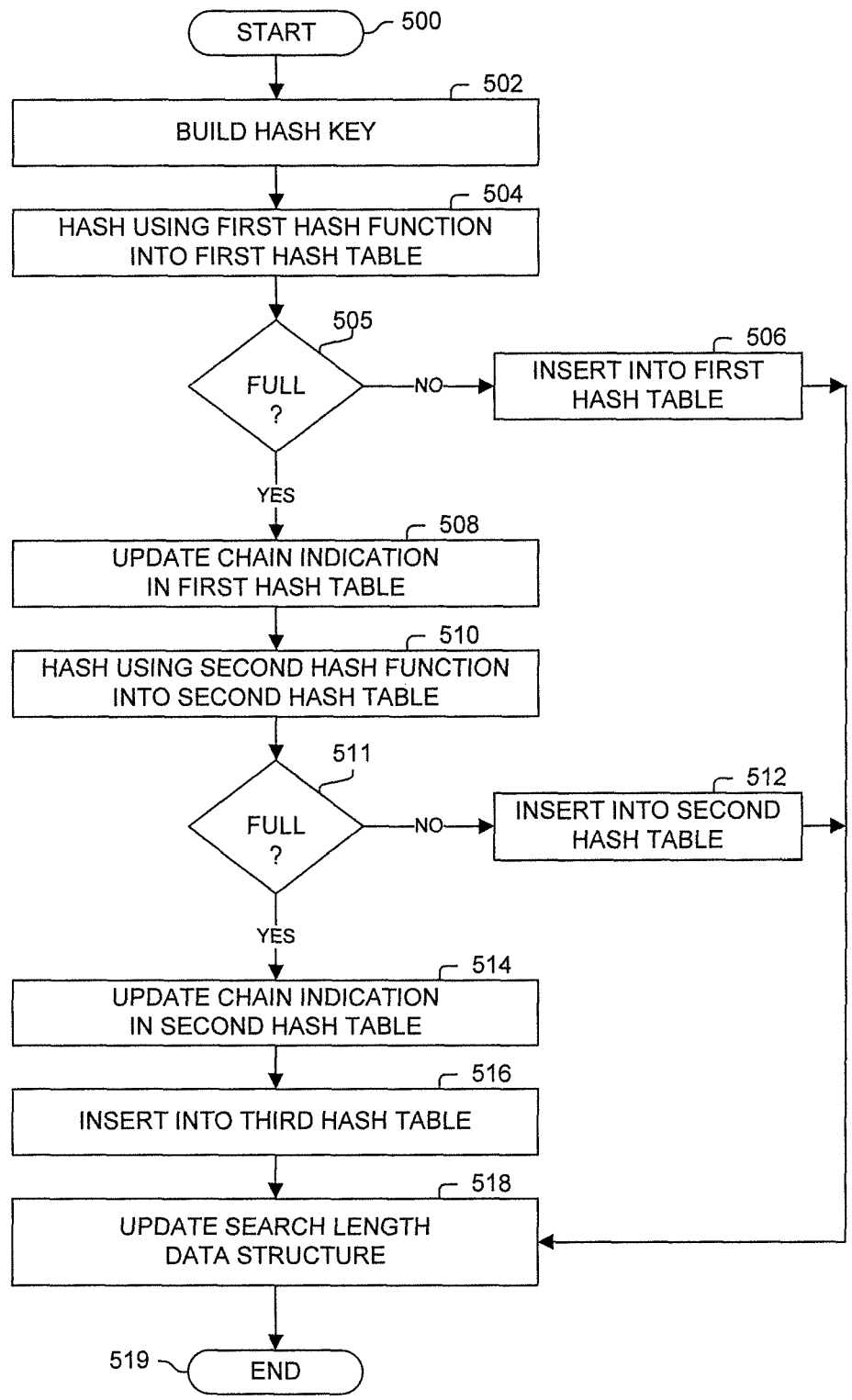
FIG. 5 illustrates a process according to one embodiment.

FIG. 5 illustrates a process for installing a prefix according to one embodiment. In one embodiment, the installation (as well as packet processing) is performed by a processor (e.g., network processing unit or NPU) on the chip via a simple command such as "insert prefix 245.1.1/24." In one embodiment, an off-chip processor provides detailed instructions for populating the hash tables.

Processing of FIG. 5 begins with process block 500, and in process block 502, a hash key is built for a prefix (with related information) to be installed in the FIB. In process block 504, the first hash function is used to hash into the first hash table.

As determined in process block 505, when there is space for another entry, then in process block 506, the hashed value is inserted into the first hash table (including adding the resultant action) and processing proceeds to process block 518.

As determined in process block 505, when there is not space for another entry, then the chain indication is updated in the first hash table in process block 508. In process block 510, the second hash function is used to hash into the second hash table.

As determined in process block 511, when there is space for another entry, then in process block 512, the hashed value is inserted into the second hash table (including adding the resultant action) and processing proceeds to process block 518.

As determined in process block 511, when there is not space for another entry, then the chain indication is updated in the second hash table in process block 514, the hashed value is inserted into the third hash table in process block 516, and processing proceeds to process block 518.

In process block 518, a search length data structure is updated to reflect that for this hash key, the corresponding prefix length needs to be searched. The search length data structure of one embodiment is described further in relation to FIGS. 7A-C. Processing of the flow diagram of FIG. 5 is complete as indicated by process block 519.

Figure 6:
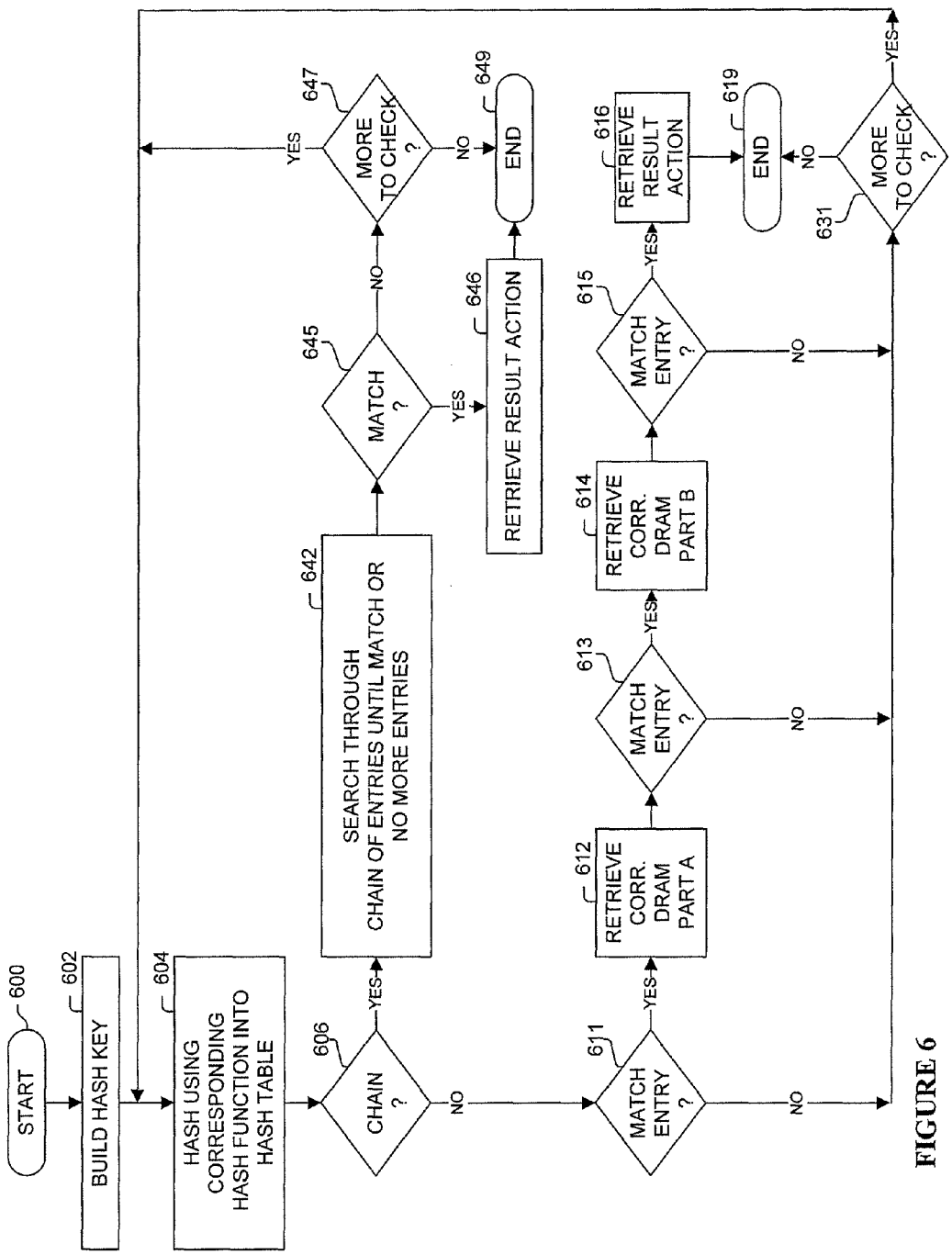
FIG. 6 illustrates a process according to one embodiment.

FIG. 6 illustrates a process for looking up a single prefix in a FIB according to one embodiment. Processing begins with process block 600. In process block 602, a hash key is built for the packet including the prefix. In process block 604, a corresponding hash function is used to hash into a corresponding hash table to be searched. In one embodiment, searching progresses from hash table one to hash table two to hash table three, stopping when a match is found or when it is determined that no match is possible within any of the hash tables.

As determined in process block 606, if the hash table does not use chained entries, then processing proceeds to process block 611, else to process block 642. One embodiment uses chained entries when a hash bucket includes more than two entries.

Processing continues in process block 611 for searching a hash bucket including zero, one, or two entries (without chaining of entries). In one embodiment, a hash bucket includes more than two entries without chaining of entries. As long as one of the entries continues to match a current portion of a hash table entry, then a next portion is checked. As soon as there is no longer a possibility of matching any entry in the hash bucket, the searching of that hash bucket ceases, and thus, avoids further delay such as that caused by retrieving additional portions of the hash bucket from off-chip DRAM.

As determined in process block 611, if one of the bucket entries matches the current portion (e.g., from on-chip memory), then processing proceeds to process block 612 to retrieve the corresponding next portion from off-chip DRAM. As determined in process block 613, if one of the bucket entries matches the previous portion and current portion (e.g., from off-chip memory), then processing proceeds to process block 614 to retrieve the corresponding next portion from off-chip DRAM. As determined in process block 615, if one of the bucket entries matches the previous two portions and current portion (e.g., from off-chip memory), then processing proceeds to process block 616 to retrieve the resulting action for how to process the packet, and processing of the flow diagram of FIG. 6 is complete as indicated by process block 619.

Otherwise, in process block 611, 613, or 615, it was determined that the hash key does not match an entry in the current hash bucket, and processing proceeds to process block 631. As determined in process block 631, if there are more hash tables to check for the current hash key (e.g., check hash table one, then hash table two, then hash table three in one embodiment), then processing returns to process block 604 to search a next hash table.

Processing reaches process block 642 when a determination is made in process block 606 that a current hash table is using chained entries (e.g., there are more than two entries so a linked list is used). In process block 642, the chain of entries is searched until either a match is found or a determination is made that a match is not possible. As determined in process block 645, if a match was found, then processing proceeds to process block 646 to retrieve the resulting action for how to process the packet, and processing of the flow diagram of FIG. 6 is complete as indicated by process block 649. Otherwise, a match was not found in the current hash table as determined in process block 645, then as determined in process block 647, if there is at least one more hash table to check for the current hash key (e.g., check hash table one, then hash table two, then hash table three), then processing returns to process block 604 to search a next hash table. Otherwise, processing of the flow diagram of FIG. 6 is complete as indicated by process block 649.

Figure 7A:
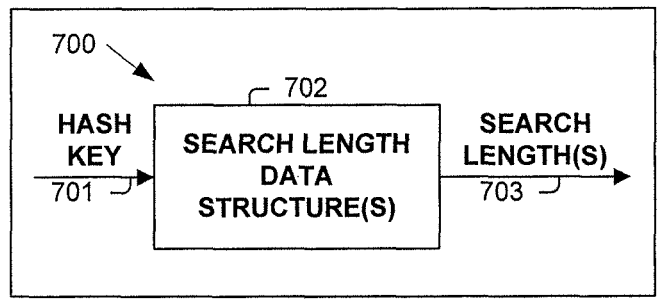
FIG. 7A illustrates a search length data structure according to one embodiment.

FIG. 7A illustrates a search length data structure according to one embodiment. In determining how to process a packet, often a longest-prefix-matching operation is performed. The search space of possible prefix lengths to search ranges from (a) the longest length being the length of the current prefix to (b) the smallest prefix length (e.g., one bit). This space can be searched linearly, or using a search algorithm (e.g., binary search) to increase the overall search efficiency.

When using exact matching of a prefix in hash tables, then a different search of the hash tables is performed for each prefix length being checked. One embodiment reduces this search space by having a search length data structure that stores a list of search lengths to search for a given hash key, such as configuration 700 shown in FIG. 7A. A hash key 701 is input to search length data structure 702, with the output being a list of zero or more search lengths to search in the hash tables.

Figure 7B:
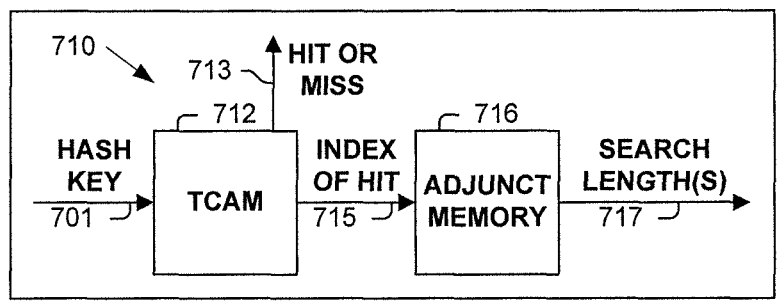
FIG. 7B illustrates a search length data structure according to one embodiment.

One embodiment of a search length data structure 710 is shown in FIG. 7B. A hash key 701 is input to ternary content-addressable memory (TCAM) 712, which generates a hit or miss signal 713. If a miss, then no hash table needs to be searched as no matching entry will be found (e.g., there are no prefix lengths to search for that hash key). If a hit, then the index of the hit 715 is used as in retrieving from a corresponding memory location in adjunct memory 716, a maximum set of search lengths 717 to be searched in the hash table. This is a maximum set of lengths because no length greater than the current prefix length needs to be searched. TCAM 712 and adjunct memory 716 are programmed such, but not limited to, in process block 518 of FIG. 5 and/or by a process corresponding to the flow diagram of FIG. 7C.

Figure 7C:
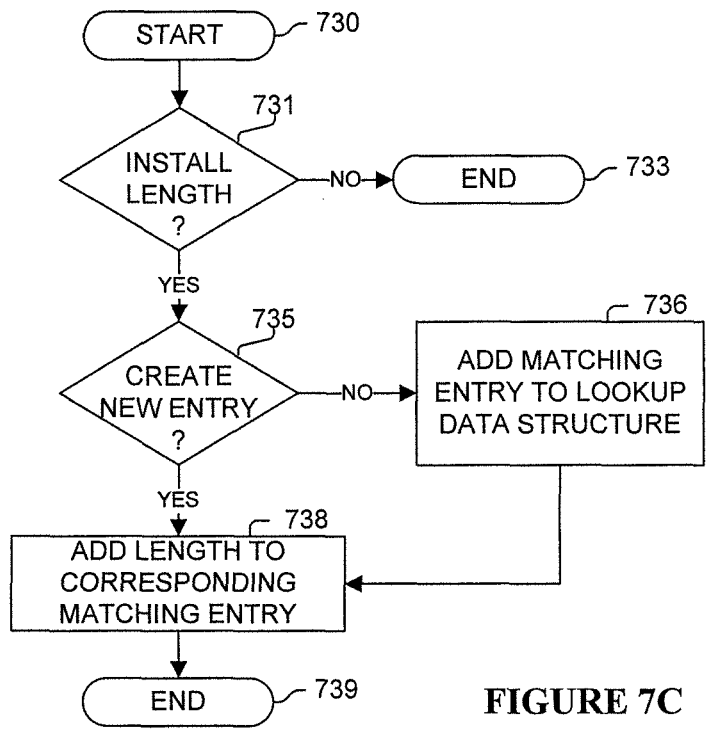
FIG. 7C illustrates a process according to one embodiment.

Processing of the flow diagram of FIG. 7C commences with process block 730. As determined in process block 731, if a prefix length does not need to be installed (e.g., the length is already in the search length data structure that will match the current hash key), then processing of the flow diagram of FIG. 7C is complete as indicated by process block 733. Otherwise, the search length data structure is to be updated as determined in process block 731, and processing proceeds to process block 735. A determination is made in process block 735 of whether to create a new entry in the search length data structure or to simply add a search length to a matching entry already in the search length data structure. As any hash key that matches an entry in the search length data structure may have to search all associated prefix lengths, it is often desirable to keep that list of prefix lengths to search short. So, a new entry may be created and put in a higher priority search position in the search length data structure such that this new prefix length will not be added to an existing entry. Continuing with processing, as determined in process block 735 that a new entry is to be created, then in process block 736, the new entry is created with its associated prefix length; otherwise, in process block 738, the current prefix length is added to the prefix length(s) already associated with a matching entry in the search length data structure. Processing of the flow diagram of FIG. 7C is complete as indicated by process block 739.

Figure 8:
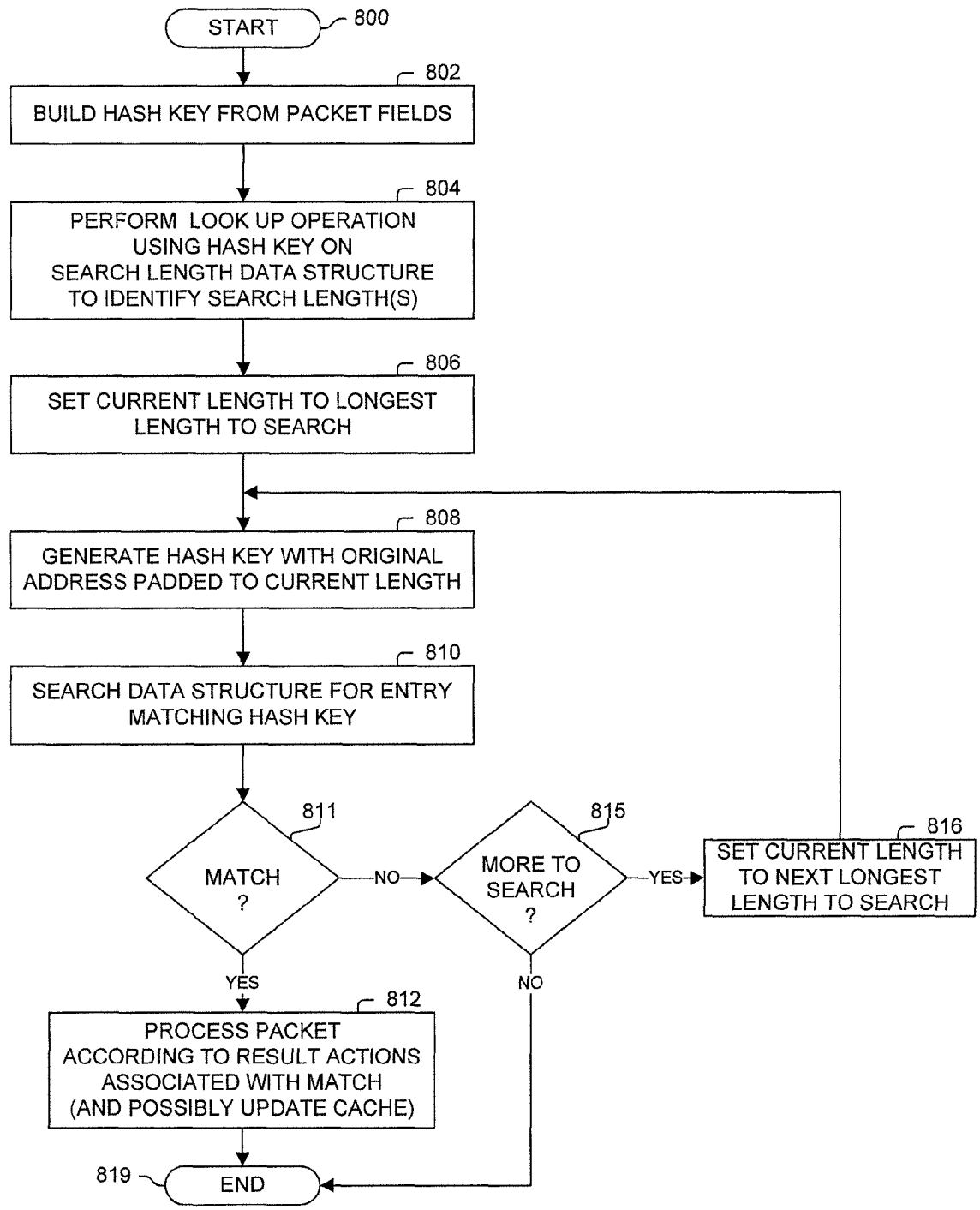
FIG. 8 illustrates a process according to one embodiment.

FIG. 8 illustrates a process for performing a longest-prefix-matching lookup operation according to one embodiment. Processing begins with process block 800. In process block 802, a hash key is built from the fields of a packet (e.g., from its packet header). In process block 804, a lookup operation is performed on a search length data structure to determine the prefix lengths to search (filtering out any lengths greater than the length of the prefix being searched), and setting the current length to the longest length to search in process block 806.

Processing continues with process block 808, wherein a hash key is generated with the original address padded to the current prefix length being searched. In process block 810, a search is performed on the generated hash key in a FIB (e.g., the three hash tables in one embodiment such as using a process corresponding to the flow diagram of FIG. 6 in one embodiment). As determined in process block 811, if a match was found (e.g., the longest prefix match), then in process block 812, the packet is processed according to the determined result action(s). In one embodiment, a cache may be updated to cache the hash key and its lookup result. In one embodiment, a small cache is used to store entries corresponding to hash keys that take a large number of memory accesses to resolve. In one embodiment, entries are added to the cache if a threshold number of memory accesses is exceeded. In one embodiment, the cache maintains a set of entries that take the largest number of memory access. One embodiment also ages the cache, considers how often a hash key is searched, and/or considers other characteristics when maintaining the cache. Processing of the flow diagram of FIG. 8 is complete as indicated by process block 819.

Otherwise, as determined in process block 811, no match was found and then in process block 815, a determination is made whether there remains additional prefix lengths to search. If more prefix lengths are to be searched for the original hash key, then in process block 816, the current length is set to the next longest length to search, and processing returns to process block 808. Otherwise, there are no more searches to be performed as determined in process block 815, and processing of the flow diagram of FIG. 8 is complete as indicated by process block 819.

Figure 9A:
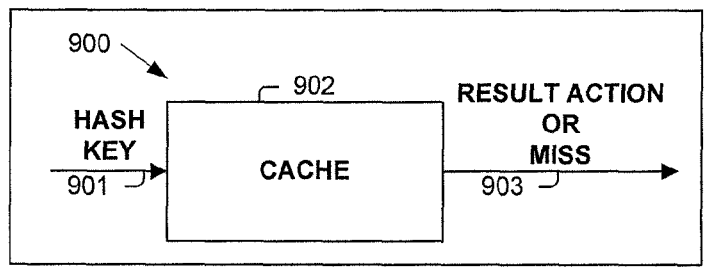
FIG. 9A illustrates a cache according to one embodiment.

FIG. 9A illustrates a cache configuration 900 according to one embodiment. In one embodiment, there may be a small number (e.g., on the order of one thousand twenty-four or less) of hash keys that take a long time to search and/or are often searched. The search rate on such prefixes may be increased using a cache. Thus, certain hash keys are maintained in a cache.

In one embodiment as shown in FIG. 9A, a hash key 901 is provided to cache 902, which produces either a result action (903) in response to a cache hit, or a cache miss (903) (then the hash tables are searched in one embodiment).

Figure 9B:
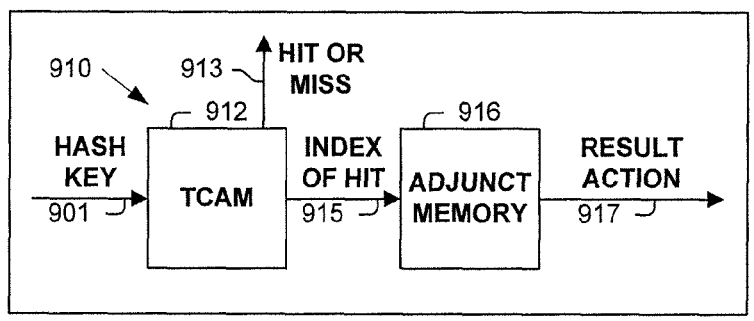
FIG. 9B illustrates a cache according to one embodiment.

FIG. 9B illustrates a cache configuration 910 according to one embodiment. Hash key 901 is input to ternary content-addressable memory (TCAM) 912, which generates a hit or miss signal 913. If a cache miss occurs, then the hash tables are searched in one embodiment. If a hit occurs, then the index of the hit 915 is used in retrieving from a corresponding memory location in adjunct memory 916, the result action 917 for how to process the packet.

Figure 9C:
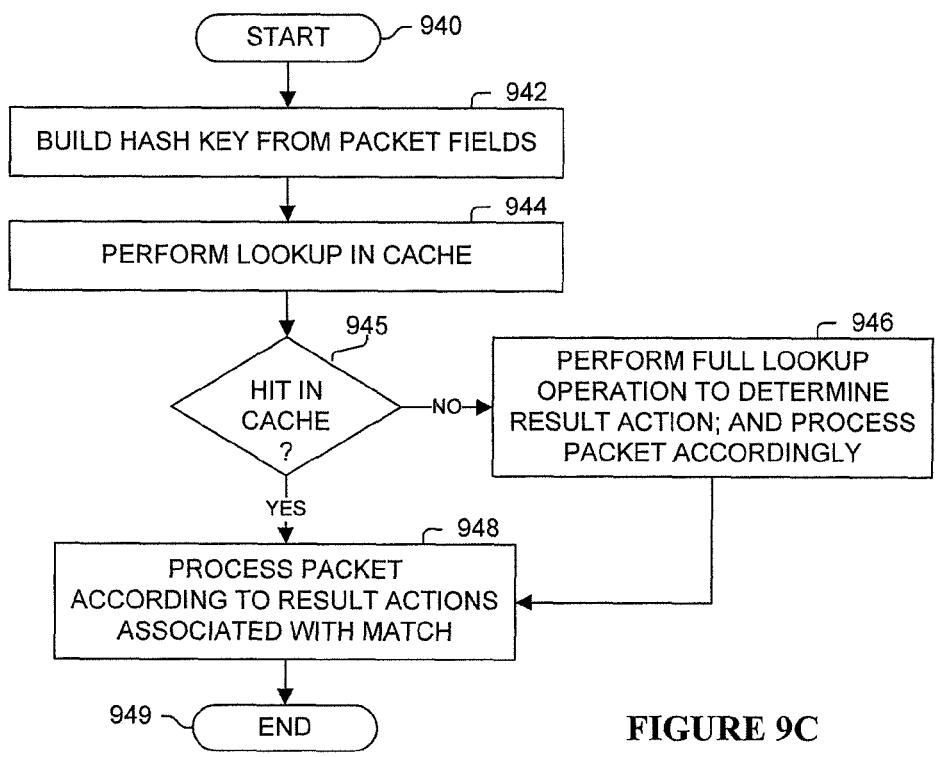
FIG. 9C illustrates a process according to one embodiment.

FIG. 9C illustrates a process according to one embodiment. Processing begins with process block 940. In process block 942, a hash key is built from the fields of a packet (e.g., from the packet header). In process block 944, a lookup operation is performed on the cache. As determined in process block 945, if a cache hit occurs, then in process block 948, the packet is processed according to the result action; otherwise, in process block 946, a lookup operation is performed on the hash tables to determine how to process the packet, with it being so processed. Processing of the flow diagram of FIG. 9C is complete as indicated by process block 949.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
    determining, by a lookup chip of a packet switching device, processing information for a packet based on a lookup operation in a hash table spanning a plurality of memories, with the plurality of memories including on-chip lookup memory and off-lookup chip memory, with the hash table including a plurality of hash table entries of hash table buckets, and with each of the plurality of hash table entries spanning the plurality of memories when stored in the hash table; and
    processing, by the packet switching device, the packet according to said processing information;
    wherein said determining processing information includes:
        identifying the first hash bucket in a hash table, which includes deriving a hash key from a header of the packet and hashing the hash key using a first hash function, with the first hash bucket including a first bucket entry with one or more first portions of the first bucket entry in the first hash bucket in the hash table stored in the on-lookup chip memory and one or more second portions of the first bucket entry in the hash table stored in the off-lookup chip memory, and with said processing information associated with the first bucket entry; and
        confirming that the first bucket entry matches the hash key which includes: in response to determining first current information extracted from the hash key matches the one or more first portions of the first bucket entry stored in said on-lookup chip memory, retrieving said one or more second portions of the first bucket entry in the hash table from said off-lookup chip memory and determining second current information extracted from the hash key matches said retrieved one or more second portions of the first bucket entry stored in said off-lookup chip memory.

2. The method of claim 1, wherein said determining processing information includes performing longest prefix matching of a destination address from the header including deriving a particular hash key from the destination address and using the first hash function to hash into a particular entry in the hash table which may result in a collision in that the particular entry corresponds to a different prefix length than the prefix length of the particular hash key.

3. The method of claim 2, wherein said performing longest prefix matching of the destination address includes performing a lookup operation on the hash table for a plurality of different prefix length hash keys until a matching entry of the hash table is found.

4. The method of claim 3, comprising performing a lookup operation on a search length data structure for the packet resulting in an identification of a search space of prefix lengths for said longest prefix matching, with said longest prefix matching being responsive to the search space of prefix lengths.

5. The method of claim 1, wherein the first bucket entry includes an installed signature in said on-lookup chip memory; and wherein said confirming that the first bucket entry matches the hash key includes matching a lookup signature of the hash key against said installed signature prior to accessing said one or more portions of the first bucket entry stored in said off-chip memory.

6. The method of claim 5, wherein said confirming that the first bucket entry matches the hash key includes hashing at least a portion of the hash key using a second hash function in generating the lookup signature.

7. The method of claim 5, wherein the lookup signature includes a prefix length indication, having less bits than the number of bits storing a prefix length in the hash key, and identifying one or more ranges of lengths of prefixes.

8. The method of claim 1, wherein the hash key includes a protocol type, a virtual routing and processing identification, a prefix, and a length of the prefix.

9. A packet switching device, comprising:
    off-lookup chip memory; and
    a lookup chip including one or more processors and on-lookup chip memory;
    wherein the packet switching device processes a packet according to processing information determined by the lookup chip based on a lookup operation in a hash table spanning a plurality of memories, with the plurality of memories including said on-chip lookup memory and said off-lookup chip memory, with the hash table including a plurality of hash table entries of hash table buckets, and with each of the plurality of hash table entries spanning the plurality of memories when stored in the hash table; and wherein said processing information determination includes:
identifying a first hash bucket in the hash table, which includes deriving a hash key from a header of the packet and hashing the hash key using a first hash function, with the first hash bucket including a first bucket entry with one or more first portions of the first bucket entry in the first hash bucket in the hash table stored in the on-lookup chip memory and one or more second portions of the first bucket entry in the hash table stored in the off-lookup chip memory, and with said processing information associated with the first bucket entry; and
confirming that the first bucket entry matches the hash key which includes: in response to determining first current information extracted from the hash key matches the one or more first portions of the first bucket entry stored in said on-lookup chip memory, retrieving said one or more second portions of the first bucket entry in the hash table from said off-lookup chip memory and determining second current information extracted from the hash key matches said retrieved one or more second portions of the first bucket entry stored in said off-lookup chip memory.

10. The packet switching device of claim 9, wherein said processing information determination includes performing longest prefix matching of a destination address from the header including deriving a particular hash key from the destination address and using the first hash function to hash into a particular entry in the hash table which may result in a collision in that the particular entry corresponds to a different prefix length than the prefix length of the particular hash key.

11. The packet switching device of claim 10, wherein said performing longest prefix matching of the destination address includes performing a lookup operation on the hash table for a plurality of different prefix length hash keys until a matching entry of the hash table is found.

12. The packet switching device of claim 11, comprising performing a lookup operation on a search length data structure for the packet resulting in an identification of a search space of prefix lengths for said longest prefix matching, with said longest prefix matching being responsive to the search space of prefix lengths.

13. The packet switching device of claim 9, wherein the first bucket entry includes an installed signature in said on-lookup chip memory; and wherein said confirming that the first bucket entry matches the hash key includes matching a lookup signature of the hash key against said installed signature prior to accessing said one or more portions of the first bucket entry stored in said off-chip memory.

14. The packet switching device of claim 13, wherein said confirming that the first bucket entry matches the hash key includes hashing at least a portion of the hash key using a second hash function in generating the lookup signature.

15. The packet switching device of claim 13, wherein the lookup signature includes a prefix length indication, having less bits than the number of bits storing a prefix length in the hash key, and identifying one or more ranges of lengths of prefixes.

16. The packet switching device of claim 9, wherein the hash key includes a protocol type, a virtual routing and processing identification, a prefix, and a length of the prefix.

* * * * *

UNITED STATES PATENT AND TRADEMARK OFFICE
CERTIFICATE OF CORRECTION

PATENT NO. : 9,917,776 B2
APPLICATION NO. : 14/515779
DATED : March 13, 2018
INVENTOR(S) : Hasani Page 1 of 1

It is certified that error appears in the above-identified patent and that said Letters Patent is hereby corrected as shown below:

In the Claims

Column 11, Claim 1, Line 62, replace "the first hash bucket in a hash table," with - a first hash bucket in the hash table, -

Signed and Sealed this
Second Day of April, 2019

Andrei Iancu
*Director of the United States Patent and Trademark Office*